(12) United States Patent
Milota et al.

(10) Patent No.: US 9,989,988 B2
(45) Date of Patent: *Jun. 5, 2018

(54) DISTRIBUTED MEMS DEVICES TIME SYNCHRONIZATION METHODS AND SYSTEM

(71) Applicant: mCube Inc., San Jose, CA (US)

(72) Inventors: Andy Milota, San Jose, CA (US); Jobe Price, North Liberty, IA (US)

(73) Assignee: mCube, Inc., San Jose, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/157,354

(22) Filed: May 17, 2016

(65) Prior Publication Data

US 2016/0259364 A1 Sep. 8, 2016

Related U.S. Application Data

(63) Continuation of application No. 13/758,929, filed on Feb. 4, 2013, now Pat. No. 9,471,092.

(Continued)

(51) Int. Cl.
*G06F 1/14* (2006.01)
*G06F 1/12* (2006.01)
(Continued)

(52) U.S. Cl.
CPC .................. *G06F 1/12* (2013.01); *G06F 1/14* (2013.01); *H04W 52/029* (2013.01); *H04W 56/001* (2013.01); *Y02B 60/50* (2013.01)

(58) Field of Classification Search
CPC .......... G06F 1/12; G06F 1/14; H04W 52/029; H04W 56/001; Y02B 60/50
(Continued)

(56) References Cited

U.S. PATENT DOCUMENTS 3,659,085 A 4/1972 Potter et al.
7,937,232 B1 5/2011 Chow et al.
(Continued)

OTHER PUBLICATIONS

Klingbeil et al., A modular and mobile system for indoor localization, International Conference on Indoor Positioning and Indoor Navigation (I PIN), Zurich, Switzerland, Sep. 15-17, 2010, pp. 1-10.
(Continued)

*Primary Examiner* — Aurel Prifti
(74) *Attorney, Agent, or Firm* — Kilpatrick Townsend & Stockton LLP

(57) ABSTRACT

A method is provided for time synchronization in a MEMS (MicroElectroMecahnical system) based system having a MEMS processor and a plurality of MEMS devices. In a specific embodiment, the method includes, in the MEMS processor, transmitting a synchronization signal to the plurality of MEMS devices and saving a local time upon transmitting the synchronization signal. The MEMS processor also receives sampled data and time information from the plurality of MEMS devices, when the data and information become available. The method also includes, in one or more of the MEMS devices, receiving the synchronization signal from the MEMS processor and storing a local time upon receiving the synchronization signal. The MEMS device also performs a sensing operation and stores sampled sense data and sense time information.

20 Claims, 3 Drawing Sheets

Related U.S. Application Data

(60) Provisional application No. 61/595,011, filed on Feb. 3, 2012.

(51) Int. Cl.
    *H04W 52/02* (2009.01)
    *H04W 56/00* (2009.01)

(58) Field of Classification Search
    USPC .................................. 370/503; 709/248; 1/1
    See application file for complete search history.

(56) References Cited

U.S. PATENT DOCUMENTS

| | | | |
|---|---|---|---|
| 8,063,872 B2 | 11/2011 | Forstall et al. | |
| 8,065,508 B2 | 11/2011 | Rubin et al. | |
| 8,098,200 B1 | 1/2012 | Gines | |
| 8,502,659 B2 | 8/2013 | Richey | |
| 8,510,077 B1 | 8/2013 | Zhang et al. | |
| 8,527,308 B2 | 9/2013 | Nielsen et al. | |
| 8,589,066 B2 | 11/2013 | Haleem | |
| 8,643,544 B2 | 2/2014 | Taylor et al. | |
| 8,712,686 B2 | 4/2014 | Bandyopadhyay et al. | |
| 8,745,430 B2 | 6/2014 | Cornelius et al. | |
| 8,849,605 B2 | 9/2014 | Lakhzouri et al. | |
| 8,904,410 B2 | 12/2014 | Kelly | |
| 9,097,536 B2 | 8/2015 | Kelly et al. | |
| 9,519,306 B2* | 12/2016 | Kishiro | H04Q 9/04 |
| 2003/0058010 A1 | 3/2003 | DeCusatis et al. | |
| 2004/0140962 A1 | 7/2004 | Wang et al. | |
| 2004/0162084 A1 | 8/2004 | Wang | |
| 2004/0203880 A1 | 10/2004 | Riley | |
| 2005/0192024 A1 | 9/2005 | Sheynblat | |
| 2005/0254712 A1 | 11/2005 | Lindeman | |
| 2006/0056560 A1 | 3/2006 | Aweya et al. | |
| 2006/0137198 A1 | 6/2006 | Cato | |
| 2007/0139269 A1 | 6/2007 | Chen et al. | |
| 2007/0159924 A1 | 7/2007 | Vook et al. | |
| 2009/0099820 A1 | 4/2009 | Kaplan | |
| 2009/0171583 A1 | 7/2009 | DiEsposti | |
| 2010/0307016 A1 | 12/2010 | Mayor et al. | |
| 2011/0066874 A1 | 3/2011 | Shen et al. | |
| 2011/0239026 A1 | 9/2011 | Kulik | |
| 2012/0007850 A1 | 1/2012 | Piemonte et al. | |
| 2012/0027030 A1* | 2/2012 | Naito | G01V 1/22 370/503 |
| 2012/0059780 A1 | 3/2012 | Könönen et al. | |
| 2012/0116677 A1 | 5/2012 | Higgison et al. | |
| 2012/0116684 A1 | 5/2012 | Ingrassia, Jr. et al. | |
| 2012/0203486 A1 | 8/2012 | Almalki et al. | |
| 2012/0243559 A1 | 9/2012 | Pan et al. | |
| 2012/0259578 A1 | 10/2012 | Bevilacqua et al. | |
| 2012/0309412 A1 | 12/2012 | MacGougan et al. | |
| 2012/0317430 A1 | 12/2012 | Rahman et al. | |
| 2013/0157682 A1 | 6/2013 | Ling | |
| 2013/0158928 A1 | 6/2013 | Hogdal | |
| 2013/0159749 A1 | 6/2013 | Moeglein et al. | |
| 2013/0205306 A1 | 8/2013 | Kelly | |
| 2013/0211711 A1 | 8/2013 | Kelly et al. | |
| 2013/0219207 A1 | 8/2013 | Milota et al. | |
| 2013/0226505 A1 | 8/2013 | Kelly et al. | |
| 2013/0244692 A1 | 9/2013 | Kelly et al. | |
| 2013/0254427 A1* | 9/2013 | Kozakai | G06F 1/14 709/248 |
| 2014/0047259 A1 | 2/2014 | Price et al. | |
| 2014/0149069 A1 | 5/2014 | Kelly et al. | |
| 2014/0324745 A1 | 10/2014 | Leppänen et al. | |

OTHER PUBLICATIONS

U.S. Appl. No. 13/755,242, Non-Final Office Action dated Mar. 10, 2014, 14 pages.

U.S. Appl. No. 13/755,242, Notice of Allowance dated Jul. 28, 2014, 19 pages.

U.S. Appl. No. 13/758,381, Non-Final Office Action dated Jan. 12, 2016, 21 pages.

U.S. Appl. No. 13/758,486, Final Office Action dated Dec. 16, 2014, 9 pages.

U.S. Appl. No. 13/758,486, Non-Final Office Action dated Jul. 3, 2014, 8 pages.

U.S. Appl. No. 13/758,486, Notice of Allowance dated Mar. 30, 2015, 5 pages.

U.S. Appl. No. 13/758,707, Non-Final Office Action dated Aug. 14, 2015, 14 pages.

U.S. Appl. No. 13/758,707, Notice of Allowance dated Mar. 2, 2016, 8 pages.

U.S. Appl. No. 13/758,929, Final Office Action dated Aug. 27, 2015, 11 pages.

U.S. Appl. No. 13/758,929, Non-Final Office Action dated Feb. 12, 2015, 14 pages.

U.S. Appl. No. 13/758,929, Notice of Allowance dated Feb. 18, 2016, 13 pages.

U.S. Appl. No. 13/759,027, Non-Final Office Action dated Feb. 5, 2015, 15 pages.

U.S. Appl. No. 13/846,917, Non-Final Office Action dated Mar. 3, 2015, 12 pages.

U.S. Appl. No. 13/846,917, Notice of Allowance dated Jul. 8, 2015, 8 pages.

* cited by examiner

DISTRIBUTED MEMS DEVICES TIME SYNCHRONIZATION METHODS AND SYSTEM

CROSS-REFERENCES TO RELATED APPLICATIONS

This application is a continuation application of U.S. patent application Ser. No. 13/758,929, filed Feb. 4, 2013, which claims priority to U.S. Provisional Patent Application No. 61/595,011, filed Feb. 3, 2012, commonly owned, the content of both of which is incorporated by reference herein for all purposes.

BACKGROUND OF THE INVENTION

The present invention relates to portable computing devices. More specifically, the present invention relates to a system and methods for timing synchronization in an MEMS (MicroElectroMechanical system) based system including a plurality of MEMS based device.

Currently, more and more portable computing devices are becoming available to the average user/consumer. Such devices may include reader-type devices (e.g. Kindle, Nook), tablet-type devices (e.g. iPad, GalaxyTab), phone-type devices (e.g. iPhone, GalaxyS2), or the like. Many of these devices now include specialized hardware (e.g. MEMS devices) that can sense physical properties or physical inputs to the device. Such specialized hardware typically includes 3-axis accelerometers, a gyroscope, and a compass that are provided on separate electronic packages.

In today's wireless handset market inertial applications such as gesture recognition, haptics, and indoor navigation have become mainstays. All of these types of applications are dependent on MEMS devices, namely the gyroscope, magnetometer, and accelerometer, etc. These devices are interfaced to by the handset's MEMS Processor (if one is provided) or by the Host itself. The inventors of this invention have observed, whether these MEMS devices are independently distributed or packaged together as one combo unit, that clock uncertainty and clock drift vs. that of the MEMS Processor or Host is a concern. Further, many of the MEMS devices in the market today count on an internal RC oscillator circuit to generate its sample clock and time tag its samples. The absolute accuracy of an RC oscillator can be as poor as +/−40% while the drift can be as large as 100 PPM per second.

The uncertainty associated with the MEMS clock source translates directly to sample rate uncertainty for the end user (i.e. inertial applications). Add to this that the fact that the MEMS Processor or Host has no accurate way to correlate the sample times of the individual MEMS devices against each other or even the Host's local (presumably more accurate) clock.

During integration of sensor data, it quickly became apparent to the inventors of this invention that the sample time uncertainty of the individual MEMS devices was a big issue. This is especially true for indoor navigation and pedestrian dead-reckoning both of which require MEMS sample rates approaching 100 Hz on multiple sensors. One blatantly obvious impact is on filter of this data. If the sample rate is uncertain, the filter bandwidths must be wider thus impacting performance. Another major issue is misalignment of data from distributed sensors. For instance it is very difficult to add tilt-compensation to an eCompass application if the magnetometer and accelerometer data is misaligned. Misaligned data can do more damage than good.

Another commonly used method to "synchronize" individual MEMS devices is via a shared clock. In this method the Host and all of the MEMS devices are tied to the same clock source, thus their clocks are always identical in frequency and phase. The inventors of the present invention have noticed that the draw backs with this technique include additional power consumption due to the distributed clock (much higher clock rate than the MEMS sample frequency) and a lack of sample synchronization across devices as there is still no known relative start time.

In light of the above, what is desired are methods and apparatus that address the issues described above.

BRIEF SUMMARY OF THE INVENTION

The present invention relates to portable computing devices. More specifically, the present invention relates to a system and methods for timing synchronization in an MEMS based system including a plurality of MEMS based device.

In some embodiments of the present invention, MEMS devices (accelerometer, magnetometer, or gyroscope, etc) are provided with a "sync" input or the capability to accurately latch its internal time. The time sync process described above allows the Host or MEMS processor to accurately align samples it receives from individual, distributed MEMS devices. It also allows the Host or MEMS processor to determine the time the samples were taken vs. local time and to compensate for sample rate uncertainties induced by poor clock accuracy in the individual sensors. The Host or MEMS processor will know the real sample rate to within the accuracy of +/−1 clock period its own clock source (which is orders of magnitude better than the individual MEMS devices). Internal FIFO's in the individual MEMS devices help ensure that the samples are uniformly spaced, but it does not tell the Host with any accuracy what the spacing between the samples is. The use of sync inputs can overcome this issue.

In some embodiments of the present invention, a method is provided for time synchronization in a MEMS system having a MEMS processor and a plurality of MEMS devices. In a specific embodiment, the method includes, in the MEMS processor, transmitting a synchronization signal to the plurality of MEMS devices and saving a local time upon transmitting the synchronization signal. The MEMS processor also receives sampled data and time information from the plurality of MEMS devices, when the data and information become available. The method also includes, in one or more of the MEMS devices, receiving the synchronization signal from the MEMS processor and storing a local time upon receiving the synchronization signal. The MEMS device also performs a sensing operation and stores sampled sense data and sense time information.

According to some embodiments of the present invention, a MEMS based device includes a MEMS sensor, an oscillator or clock generator for providing a clock signal to the MEMS device, a storage unit, and other functional units. The MEMS device also includes an input terminal for receiving a synchronization signal and an output terminal for providing access to the storage unit. The MEMS based device is configured to receive, through the input terminal, the synchronization signal, and to store a local time in the storage unit upon receiving the synchronization signal. The MEMS based device is also configured to perform a sensing operation to produce sensed data, and store, in the storage unit, the sense data and sense time information.

According to another embodiment of the present invention, a MEMS system includes a MEMS processor and a plurality of MEMS devices. The MEMS processor is also referred to as a host in a distributed MEMS based system, in which the MEMS processor is configured to control the plurality of MEMS devices. In some embodiments, MEMS processor includes one or more processors, a synchronization signal generator, an output terminal for providing the synchronization signal, and an input terminal for receiving information from each of the plurality of MEMS devices. The MEMS processor is configured to transmit, through the output terminal, the synchronization signal to the plurality of MEMS devices, and saves a local time upon transmitting the synchronization signal. The MEMS processor is also configured to receive, through the input terminal, sampled data and time information from the plurality of MEMS devices. Each MEMS device can include a MEMS sensor, an oscillator, and a register or storage device. The MEMS device can also include an input terminal for receiving the synchronization signal and an output terminal for providing access to the register. Each MEMS device is configured to receive, through the input terminal, the synchronization signal from the MEMS processor, and to store, in the register, a local time in the register upon transmitting the synchronization signal. Each MEMS device is configured to perform a sensing operation to obtain sense data, and to store, in the register, the sense data and sense time information associated with the sense data.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Embodiments of the present invention provides methods and system for improving the synchronization in a system that includes multiple MEMS (MicroElectroMechanical system) based devices.

Figure 1:
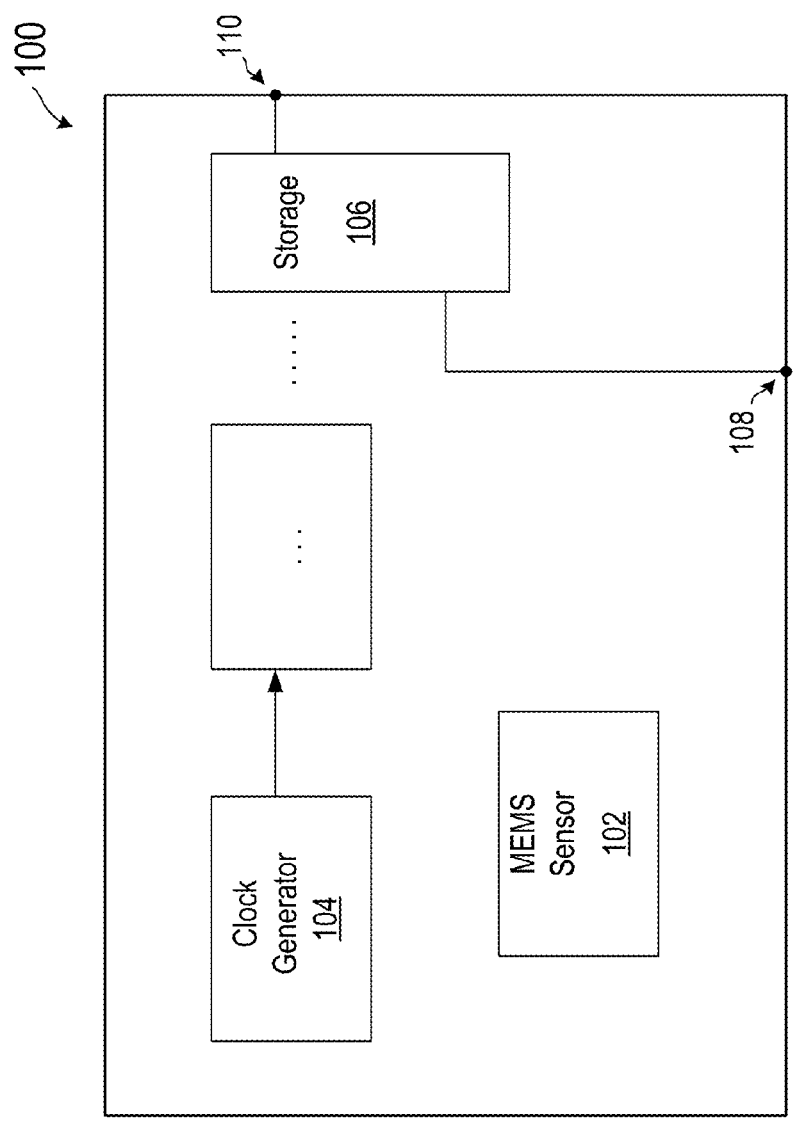
FIG. 1 illustrates a block diagram of a MEMS device according to various embodiments of the present invention.

FIG. 1 illustrates a block diagram of a MEMS based device according to various embodiments of the present invention. As shown in FIG. 1, MEMS device 100 includes a MEMS sensor 102, an oscillator or clock generator 104 for providing a clock signal to the MEMS device, a storage unit 106, and other functional units. MEMS device 100 also includes an input terminal 108 for receiving a synchronization signal, and an output terminal 110 for providing access to the storage unit. MEMS device 100 is configured to receive, through the input terminal, the synchronization signal, and store a local time in the storage unit upon receiving the synchronization signal. MEMS device 100 is also configured to perform a sensing operation to produce sensed data, and store, in the storage unit, the sense data and sense time information.

As illustrated in FIG. 1, in various embodiments of the invention, MEMS based sensor 102 can include one or more of an accelerometer, a gyroscope, a magnetometer, a pressure sensor, and a compass. MEMS sensors 102 can also include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof. In some embodiments, the storage unit includes a FIFO register. In some embodiments, the output terminal is configured in an I2C interface protocol. In some embodiments, the clock generator can include an oscillator, such as an RC oscillator.

Figure 2:
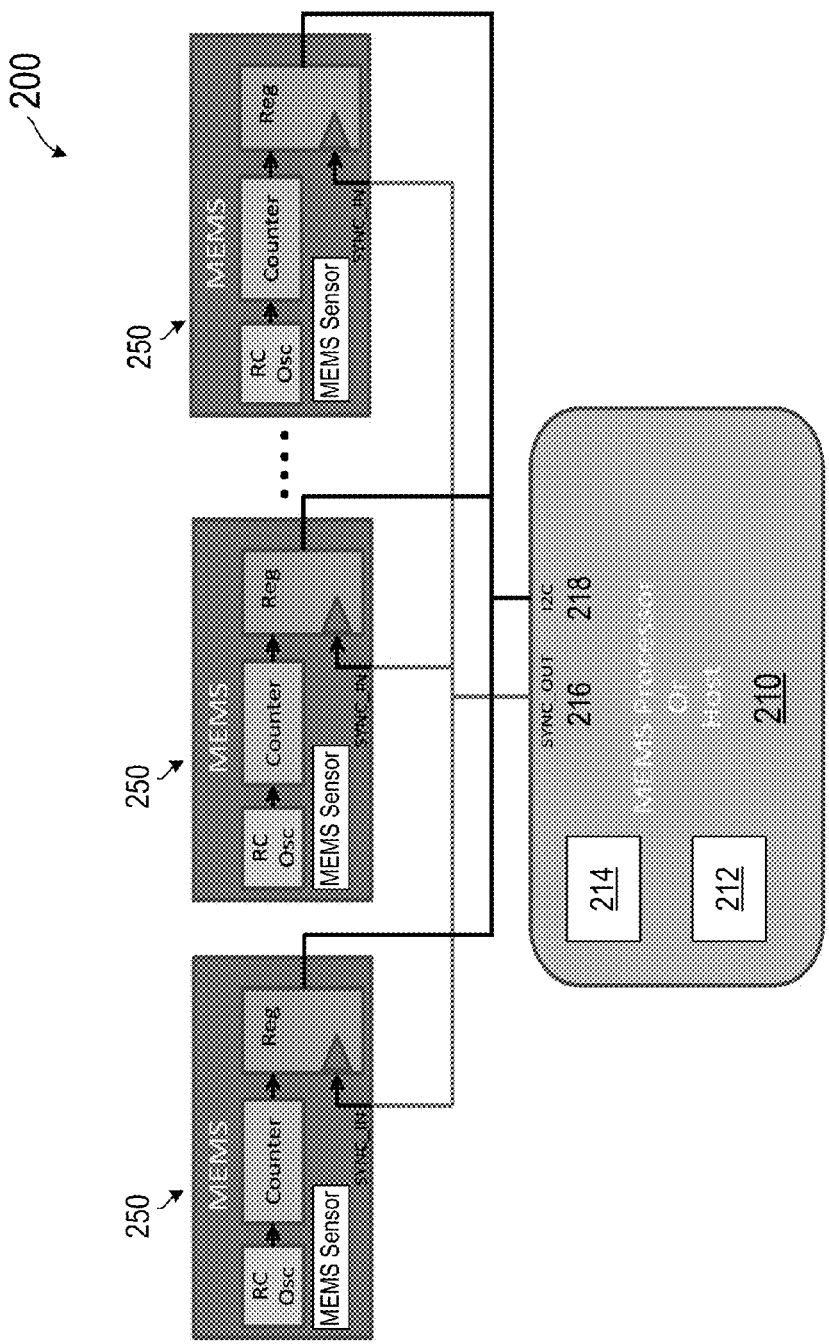
FIG. 2 illustrates a MEMS system including a processor and a plurality of MEMS devices according to various embodiments of the present invention.

FIG. 2 illustrates a MEMS system including a processor and a plurality of MEMS devices according to various embodiments of the present invention. As shown in FIG. 2, in various embodiments, a MEMS based system includes a MEMS processor 210 and a plurality of MEMS devices 250. The MEMS processor is also referred to as a host in a distributed MEMS based system, in which the MEMS processor is configured to control the plurality of MEMS devices. In some embodiments, MEMS processor 210 includes one or more processors 212, a synchronization signal generator 214, an output terminal 216 (SYNC OUT) for providing a synchronization signal, and an input terminal 218 for receiving information from the plurality of MEMS devices 250. In a specific embodiment, output terminal 218 can be configured to operate in an I2C protocol, as shown in FIG. 2.

In various embodiments, MEMS processor 210 is configured to transmit, through the output terminal, the synchronization signal to the plurality of MEMS devices, and saves a local time upon transmitting the synchronization signal. MEMS processor 210 is also configured to receive, through the input terminal, sampled data and time information from the plurality of MEMS devices.

As shown in FIG. 2, each MEMS device 250 is similar to MEMS device 100 described above in connection with FIG. 1. Therefore, its internal components shown in FIG. 2 are not individually labeled. MEMS device 250 can include a MEMS sensor, an oscillator, and a register or storage device. MEMS device 250 can also include an input terminal, labeled as SYNC_IN for receiving the synchronization signal and an output terminal for providing access to the register. Similar to MEMS device 100, each MEMS device 250 is configured to receive, through the input terminal, the synchronization signal from the MEMS processor, and to store, in the register, a local time in the register upon transmitting the synchronization signal. Each MEMS device 250 is also configured to perform a sensing operation to obtain sense data, and to store, in the register, the sense data and sense time information associated with the sense data. In FIG. 2, the register represents an internal storage unit, and in a specific embodiment, the register can be a FIFO (first in first out) register.

As shown in FIG. 2, in some embodiments, MEMS processor 210 is further configured to align sampled sense data from two or more of the plurality of MEMS devices. In some embodiments, the MEMS processor is further configured to use aligned sampled sense data to determine sample rate and jitter of each of the plurality of MEMS devices. In some embodiments, the MEMS processor is configured to transmit a synchronization signal to the plurality of MEMS devices periodically. In some embodiments, the MEMS processor is configured to transmit a synchronization signal to the plurality of MEMS devices once every second.

In some embodiments, each of the plurality of MEMS devices 250 includes one or more of an accelerometer, a gyroscope, a magnetometer, a pressure sensor, and a compass. In some embodiments, the register in each MEMS device comprises a FIFO register. In some embodiments, the MEMS processor and the plurality of MEMS devices are configure to communicate with I2C interface.

An example of the operation of MEMS system 200 described in FIG. 2 is now described below. Initially, the MEMS processor arms its sync pulse generator to fire at a specified system time. Depending on the application, the MEMS process sets up a sync pulse generator in the processor to be activated at a specific time. In some embodiments, the MEMS processor includes a sync pulse generator. In other embodiments, a MEMS device in the MEMS system may also include a sync pulse generator, and is configured arms its sync pulse generator to fire at a specified system time.

Before the specified system time is reached, the Host or MEMS Processor programs the various MEMS devices in the system to be ready to accept (and capture) the hardware sync pulse.

When the sync pulse generator is activated at the specified time, the single MEMS device, Host, or MEMS Processor provides a hardware sync pulse to the other MEMS devices in the system. In some embodiments, the sync pulse is provided at a known interval.

When transmitting the sync pulse, the transmitting device saves its local time. Depending on the embodiments, the local time can be determined based upon the rising or falling edge of the sync pulse.

Each device on the receiving end of the sync pulse saves its local time into an internal storage. In some embodiment, the storage can be an I2C accessible register. The local time can be determined upon detection of the rising or falling edge of the sync pulse.

The Host or MEMS Processor then reads the sync register of each of the MEMS devices in the system and stores the results.

During operation, each MEMS device stores its local time along with each inertial sample it captures for read back by the Host or MEMS Processor. By reading the time stamps associated with each data sample from a given MEMS device, the Host or MEMS Processor can better align the sampling time recorded in each MEMS device. For example, the Host or MEMS Processor knows within +/−one clock cycle when the each sample was captured relative to system time and the local time of the other MEMS devices in the system.

Knowing the relative time offset of each sample from every MEMS device the system can properly align samples from distributed MEMS devices and accurately ascertain the real sample rate and jitter of each of the devices.

Given that the RC oscillators in today's MEMS devices have a relatively high drift rate, the time sync process should be repeated at a nominal interval to minimize clock uncertainty among devices. In a specific embodiment, the sync rate is once a second, as many navigation devices (namely GPS chipsets) already provide a sync pulse at a 1 Hz rate (1 PPS).

According to embodiments of the present invention, a method is provided for time synchronization in a MEMS system having a MEMS processor and a plurality of MEMS devices. In a specific embodiment, the method includes, in the MEMS processor, transmitting a synchronization signal to the plurality of MEMS devices and saving a local time upon transmitting the synchronization signal. The MEMS processor also receives sampled data and time information from the plurality of MEMS devices, when the data and information become available. The method also includes, in one or more of the MEMS devices, receiving the synchronization signal from the MEMS processor and storing a local time upon receiving the synchronization signal. The MEMS device also performs a sensing operation and stores sampled sense data and sense time information.

In some embodiments, the method also includes, in the MEMS processor, aligning sampled sense data from two or more of the plurality of MEMS devices. In some embodiments, the method also includes, in the MEMS processor, using aligned sampled sense data to determine sample rate and jitter of each of the plurality of MEMS devices. In some embodiments the method includes the MEMS processor transmitting a synchronization signal to the plurality of MEMS devices periodically. In a specific embodiment, the method includes the MEMS processor transmitting a synchronization signal to the plurality of MEMS devices at a 1 Hz rate. In some embodiments, the method includes the MEMS processor receiving sampled data and time information from the plurality of MEMS devices through an I2C interface. In some embodiments, the plurality of MEMS devices includes one or more of an accelerometer, a gyroscope, a magnetometer, a pressure sensor, and a compass. In a specific embodiment, the method also includes, in one or more of the MEMS devices, storing sense data and time information in a FIFO register.

Figure 3:
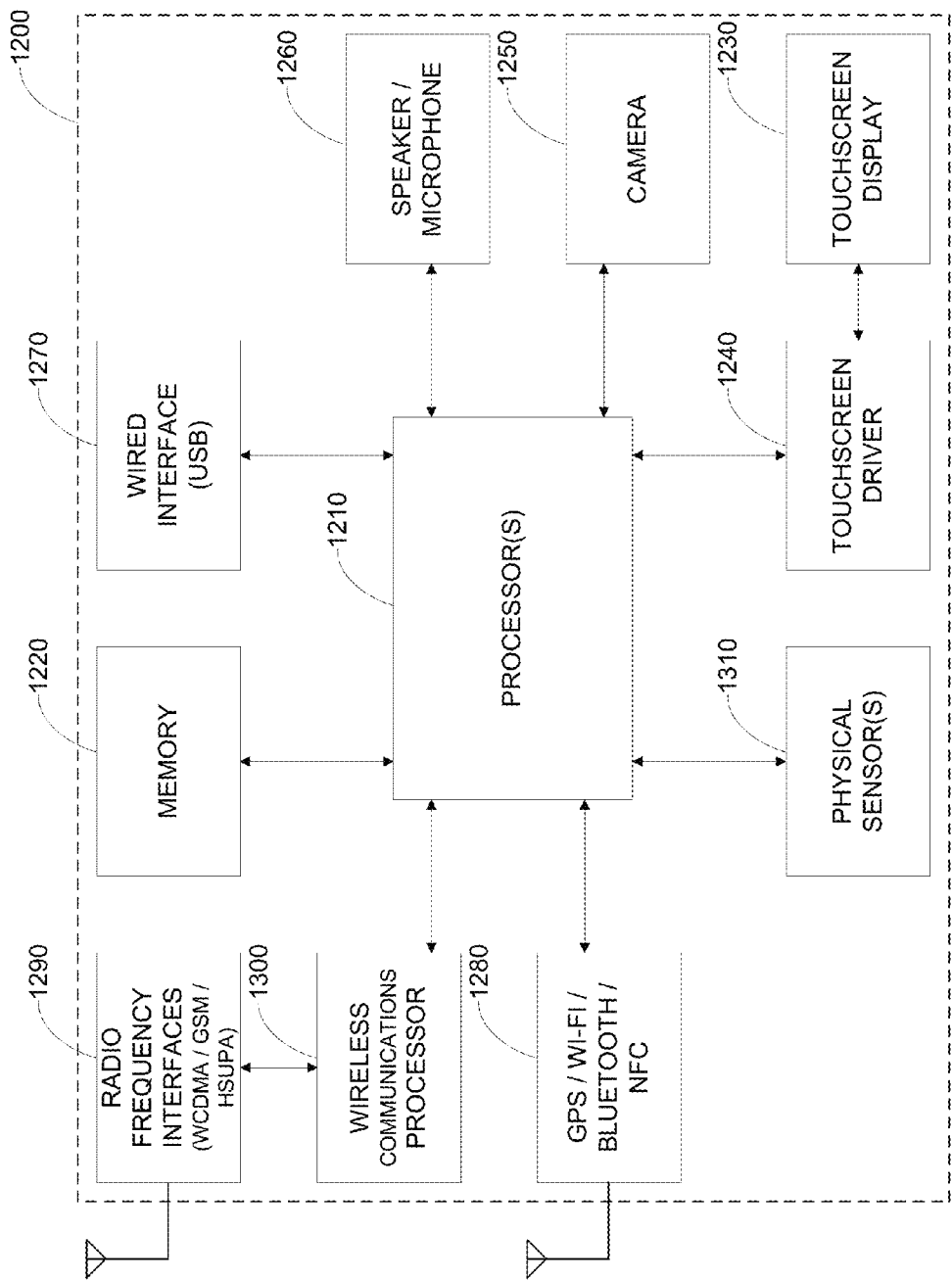
FIG. 3 illustrates a block diagram of additional embodiments of the present invention.

FIG. 3 illustrates a functional block diagram of various embodiments of the present invention. In FIG. 3, a computing device 1200 typically includes an applications processor 1210, memory 1220, a touch screen display 1230 and driver 1240, an image acquisition device 1250, audio input/output devices 1260, and the like. Additional communications from and to computing device are typically provided by via a wired interface 1270, a GPS/Wi-Fi/Bluetooth interface 1280, RF interfaces 1290 and driver 1300, and the like. Also included in various embodiments are physical sensors 1310.

In various embodiments, computing device 1200 may be a hand-held computing device (e.g. Apple iPad, Apple iTouch, Dell Mini slate, Lenovo Skylight/IdeaPad, Asus EEE series, Microsoft Courier, Samsung Galaxy Tab, Android Tablet), a portable telephone (e.g. Apple iPhone, Motorola Droid series, Google Nexus S, HTC Sensation, Samsung Galaxy S series, Palm Pre series, Nokia Lumina series), a portable computer (e.g. netbook, laptop, ultrabook), a media player (e.g. Microsoft Zune, Apple iPod), a reading device (e.g. Amazon Kindle Fire, Barnes and Noble Nook), or the like.

Typically, computing device 1200 may include one or more processors 1210. Such processors 1210 may also be termed application processors, and may include a processor core, a video/graphics core, and other cores. Processors 1210 may be a processor from Apple (A4/A5), Intel (Atom), NVidia (Tegra 2, 3), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Further, in various embodiments, the video/graphics core may be an Imagination Technologies processor PowerVR-SGX, -MBX, -VGX graphics, an Nvidia graphics processor (e.g. GeForce), or the like. Other processing capability may include audio processors, interface controllers, and the like. It is contemplated that other existing and/or later-developed processors may be used in various embodiments of the present invention.

In various embodiments, memory 1220 may include different types of memory (including memory controllers), such as flash memory (e.g. NOR, NAND), pseudo SRAM, DDR SDRAM, or the like. Memory 1220 may be fixed within computing device 1200 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 1230 and driver 1240 may be based upon a variety of later-developed or current touch screen technology including resistive displays, capacitive displays, optical sensor displays, electromagnetic resonance, or the like. Additionally, touch screen display 1230 may include single touch or multiple-touch sensing capability. Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 1250 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 1260 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 1210 to enable the user to operate computing device 1200 by stating voice commands. Additionally, a speech engine may be provided in various embodiments to enable computing device 1200 to provide audio status messages, audio response messages, or the like.

In various embodiments, wired interface 1270 may be used to provide data transfers between computing device 1200 and an external source, such as a computer, a remote server, a storage network, another computing device 1200, or the like. Such data may include application data, operating system data, firmware, or the like. Embodiments may include any later-developed or conventional physical interface/protocol, such as: USB 2.0, 3.0, micro USB, mini USB, Firewire, Apple iPod connector, Ethernet, POTS, or the like. Additionally, software that enables communications over such networks is typically provided.

In various embodiments, a wireless interface 1280 may also be provided to provide wireless data transfers between computing device 1200 and external sources, such as computers, storage networks, headphones, microphones, cameras, or the like. As illustrated in FIG. 3, wireless protocols may include Wi-Fi (e.g. IEEE 802.11 a/b/g/n, WiMax), Bluetooth, IR, near field communication (NFC), ZigBee and the like.

GPS receiving capability may also be included in various embodiments of the present invention, however is not required. As illustrated in FIG. 3, GPS functionality is included as part of wireless interface 1280 merely for sake of convenience, although in implementation, such functionality is currently performed by circuitry that is distinct from the Wi-Fi circuitry and distinct from the Bluetooth circuitry.

Additional wireless communications may be provided via RF interfaces 1290 and drivers 300 in various embodiments. In various embodiments, RF interfaces 1290 may support any future-developed or conventional radio frequency communications protocol, such as CDMA-based protocols (e.g. WCDMA), GSM-based protocols, HSUPA-based protocols, or the like. In the embodiments illustrated, driver 300 is illustrated as being distinct from applications processor 1210. However, in some embodiments, these functionalities are provided upon a single IC package, for example the Marvel PXA330 processor, and the like. It is contemplated that some embodiments of computing device 1200 need not include the RF functionality provided by RF interface 1290 and driver 1300.

FIG. 3 also illustrates computing device 1200 to include physical sensors 310. In various embodiments of the present invention, physical sensors 310 are multi-axis Micro-Electro-Mechanical Systems (MEMS) based devices being developed by M-cube, the assignee of the present patent application. Physical sensors 310 developed by M-cube currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof.

Various embodiments may include an accelerometer with a reduced substrate displacement bias, as described above. Accordingly, using such embodiments, computing device 1200 is expected to have a lower sensitivity to temperature variations, lower sensitivity to production/assembly forces imparted upon to an accelerometer, faster calibration times, lower production costs, and the like.

As described in the patent applications referenced above, various embodiments of physical sensors 310 are manufactured using a foundry-compatible process. As explained in such applications, because the process for manufacturing such physical sensors can be performed on a standard CMOS fabrication facility, it is expected that there will be a broader adoption of such components into computing device 1200. In other embodiments of the present invention, conventional physical sensors 1310 from Bosch, ST Microelectrnics, Analog Devices, Kionix or the like may be used.

In various embodiments, any number of future developed or current operating systems may be supported, such as iPhone OS (e.g. iOS), WindowsMobile (e.g. 7, 8), Google Android (e.g. 3.x, 4.x), Symbian, or the like. In various embodiments of the present invention, the operating system may be a multi-threaded multi-tasking operating system. Accordingly, inputs and/or outputs from and to touch screen display 1230 and driver 1240 and inputs/or outputs to physical sensors 310 may be processed in parallel processing threads. In other embodiments, such events or outputs may be processed serially, or the like. Inputs and outputs from other functional blocks may also be processed in parallel or serially, in other embodiments of the present invention, such as image acquisition device 1250 and physical sensors 1310.

FIG. 3 is representative of one computing device 1200 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, in various embodiments, computing device 1200 may lack image acquisition unit 1250, or RF interface 1290 and/or driver 1300, or GPS capability, or the like. Additional functions may also be added to various embodiments of computing device 1200, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for time synchronization in a MEMS (MicroElectroMechanical system) based system having a MEMS processor and a plurality of MEMS devices, the method comprising:
   in one or more of the MEMS devices,
      receiving a synchronization signal from the MEMS processor;
      storing a local time upon receiving the synchronization signal;
      performing a sensing operation to sample sense data; and
      storing the sampled sense data and sense time information; and
   in the MEMS processor,
      transmitting the synchronization signal to the plurality of MEMS devices;
      saving a local time upon transmitting the synchronization signal;
      receiving the stored local time upon receiving the synchronization signal from one or more of the MEMS devices;
      receiving sampled sense data, and sense time information from one or more of the MEMS devices; and
      determining when each sampled sense data is captured relative to a local time in the MEMS processor and the local time of other MEMS device in the system.

2. The method of claim 1, further comprising, in the MEMS processor, aligning sampled sense data from two or more of the plurality of MEMS devices.

3. The method of claim 2 further comprising, in the MEMS processor, using aligned sampled sense data to determine sample rate and jitter of each of the plurality of MEMS devices.

4. The method of claim 1 further comprising, in the MEMS processor, transmitting a synchronization signal to the plurality of MEMS devices periodically.

5. The method of claim 1 further comprising, in the MEMS processor, transmitting a synchronization signal to the plurality of MEMS devices at a 1 Hz rate.

6. The method of claim 1 wherein the plurality of MEMS devices comprises one or more of an accelerometer, a gyroscope, a magnetometer, a pressure sensor, and a compass.

7. The method of claim 1 further comprising, in one or more of the MEMS devices, storing sense data and time information in a FIFO (first in first out) register.

8. The method of claim 1 further comprising, in the MEMS processor, receiving sampled data and time information from the plurality of MEMS devices through an I2C (Inter-integrated Circuit) interface.

9. A MEMS (MicroElectroMechanical system) based system, the system comprising:
   a MEMS processor and a plurality of MEMS devices,
   wherein the MEMS processor includes:
      a processor;
      a synchronization signal generator for providing a synchronization signal;
      an output terminal for transmitting the synchronization signal; and
      an input terminal for receiving information from each of the plurality of MEMS device;
      wherein the MEMS processor is configured to:
         transmit, through the output terminal, the synchronization signal to the plurality of MEMS devices;
         saves a local time upon transmitting the synchronization signal; and
         receive, through the input terminal, sampled data and time information from the plurality of MEMS devices;
   wherein each MEMS device includes:
      a MEMS sensor;
      an oscillator;
      a register;
      an input terminal for receiving the synchronization signal; and
      an output terminal for providing access to the register;
      wherein each MEMS device is configured to:
         receive, through the input terminal, the synchronization signal from the MEMS processor;
         store, in the register, a local time in the register upon receiving the synchronization signal;
         perform a sensing operation to obtain sense data; and
         store, in the register, the sense data and sense time information associated with the sense data;
      wherein the MEMS processor is further configured to:
         receive the stored local time upon receiving the synchronization signal from each of the plurality of MEMS devices; and
         determine when each sampled sense data is captured relative to a local time in the MEMS processor.

10. The system of claim 9, wherein the MEMS processor is further configured to align sampled sense data from two or more of the plurality of MEMS devices.

11. The system of claim 10, wherein the MEMS processor is further configured to use aligned sampled sense data to determine sample rate and jitter of each of the plurality of MEMS devices.

12. The system device of claim 9, wherein the MEMS processor is configured to transmit a synchronization signal to the plurality of MEMS devices periodically.

13. The system device of claim 9, wherein the MEMS processor is configured to transmit a synchronization signal to the plurality of MEMS devices once every second.

14. The system of claim 9, wherein the plurality of MEMS devices comprises one or more of an accelerometer, a gyroscope, a magnetometer, a pressure sensor, and a compass.

15. The system of claim 9, wherein the register in each MEMS device comprises a FIFO (first in first out) register.

16. The system of claim 9, wherein the MEMS processor and the plurality of MEMS devices are configure to communicate with I2C interface.

17. A MEMS (MicroElectroMechanical System) based device, comprising:
    a MEMS sensor;
    an oscillator for providing a clock signal to the MEMS based device;
    a storage unit comprising a sync register configured to be read by an external MEMS processor;
    an input terminal for receiving a synchronization signal; and
    an output terminal for providing access to the storage unit;
    wherein the MEMS based device is configured to:
        receive, through the input terminal, the synchronization signal;
        store a local time in the sync register in the storage unit upon receiving the synchronization signal;
        perform a sensing operation to produce sensed data; and
        store, in the storage unit, the sense data and sense time information;
    wherein the MEMS based device is configured to provide the stored local time upon receiving the synchronization signal, the sense data, and the sense time for alignment in the external MEMS processor.

18. The MEMS device of claim 17, wherein the MEMS sensor comprises one or more of an accelerometer, a gyroscope, a magnetometer, a pressure sensor, and a compass.

19. The MEMS device of claim 18 wherein storage unit comprises a FIFO (first in first out) register.

20. The MEMS device of claim 17 wherein the output terminal is configured in an I2C (Inter-integrated Circuit) protocol.

* * * * *